United States Patent [19]

Freedman et al.

[11] 4,104,957
[45] Aug. 8, 1978

[54] MICROWAVE COFFEE MAKER

[75] Inventors: George Freedman, Wayland; Robert F. Bowen, Burlington, both of Mass.

[73] Assignee: Raytheon Company, Lexington, Mass.

[21] Appl. No.: 813,035

[22] Filed: Jul. 5, 1977

[51] Int. Cl.² ............................................. A47J 31/057
[52] U.S. Cl. ........................................ 99/283; 99/306; 219/10.55 E
[58] Field of Search ................ 99/281, 282, 283, 288, 99/290, 304, 305, 306; 219/10.55 E

[56] References Cited

U.S. PATENT DOCUMENTS

| | | | |
|---|---|---|---|
| 2,292,853 | 8/1942 | Wilcox | 99/305 |
| 2,601,067 | 6/1952 | Spencer | 219/10.55 E |
| 3,333,527 | 8/1967 | Bender | 99/306 |
| 3,442,199 | 5/1969 | McGrail | 99/306 |

Primary Examiner—Robert W. Jenkins
Attorney, Agent, or Firm—Harold A. Murphy; Joseph D. Pannone; John T. Meaney

[57] ABSTRACT

A coffee brewing appliance for making coffee by the drip method and comprising a reservoir containing a thermally controlled valve adapted to open at a predetermined temperature when heated by water in the reservoir which is subjected to microwave radiation allowing water to flow out of the reservoir onto and through coffee grounds in a filter beneath the valve.

10 Claims, 4 Drawing Figures

MICROWAVE COFFEE MAKER

BACKGROUND OF THE INVENTION

This invention relates to a microwave coffee brewing appliance which is adapted to be positioned within the cavity of a microwave oven which will brew coffee by the drip-type method in an extremely short time in comparison to conventional methods of coffee brewing.

Microwave coffee makers have been structured in the past for making coffee by other methods, such as shown and described in U.S. Pat. No. 2,601,067 to P. L. Spencer. For example, the process described in the Spencer patent is a percolation process which involves extracting or dissolving of constituents from coffee beans by boiling water. This is called decoction. Drip-type methods for making coffee involve the infusion process which is that whereby soluble constituents of coffee beans are extracted or dissolved into hot but not boiling water.

Because percolation includes some extraction at decoction temperatures and also includes recycling of already brewed coffee over the grounds, over-extraction usually results. This means that certain bitter constituents then become dissolved into the brewed liquor.

It is believed that since drip-type coffe is made by passing hot water only once over the coffee beans, an improved taste or quality is produced, which explains the spectacular growth of the automatic drip coffee maker.

The only other known way of using economical microwave heating for making coffee has been to boil water in a microwave oven and then insert instant coffee into the water. This is generally believed to make inferior coffee.

SUMMARY OF THE INVENTION

The present invention relates to a novel coffee brewing appliance wherein drip-type coffee is made under the influence of electromagnetic radiation in the microwave region of the spectrum. The presently described appliance employs a pair of containers removably superimposed one above the other with novel valve and filter means between them.

When coffee is to be made, a selected amount of ground coffee beans is placed in the filter element which is then attached to the bottom of the upper container. The upper container or reservoir is then positioned on top of the lower container or pot and is filled to the desired level with water. The assembly is then placed in microwave oven and subjected to microwave radiation for a selected period of time depending upon the amount of coffee to be made. For example, two cups or about ten fluid ounces of water may be heated to the required temperature in about 3 to 4 minutes.

In accordance with this invention, the valve is secured in the bottom of the water reservoir and includes a bimetal actuator which becomes heated by the water. When the actuator is heated to the required temperature, it will open the valve and permit the water to flow downwardly through it into the filter.

The filter, which contains the coffee grounds, is in the form of a basket removably secured to the reservoir beneath the valve in a position where the water from the reservoir will flow over the grounds and pass out the filter into the pot below. The valve housing is provided with suitable exit apertures through which the water flows and which distribute the water over the grounds in the desired manner.

The appliance is then removed from the oven and coffee may be poured from or drunk from the pot. The pot has a handle of special design by which the device may be conveyed.

It has been found that a valve can be designed to open at a temperature of about 180°–210° F, preferably 190°–203° F. Water will start draining through the valve at about ten ounces per minute, slower as the quantity of water in the reservoir decreases. With about 10 ounces (2 cups) of water in the reservoir, the valve generally will open in about 3 to 4 minutes depending upon the design of the microwave oven and its ability to pass microwave radiation into the water. With 5 ounces (1 cup) of water the valve will open in 2 to 2½ minutes. With 50 ounces (10 cups) the valve will open at a time controlled by the distribution of water in the reservoir; for example, it may be spread out in a wide shallow reservoir, wherepon the unit time cycle will be less then otherwise.

BRIEF DESCRIPTION OF THE DRAWINGS

The above and other objectives of this invention will be apparent from the following description taken in connection with the accompanying drawings, wherein.

DESCRIPTION OF THE PREFERRED EMBODIMENT

Figures 1, 2:
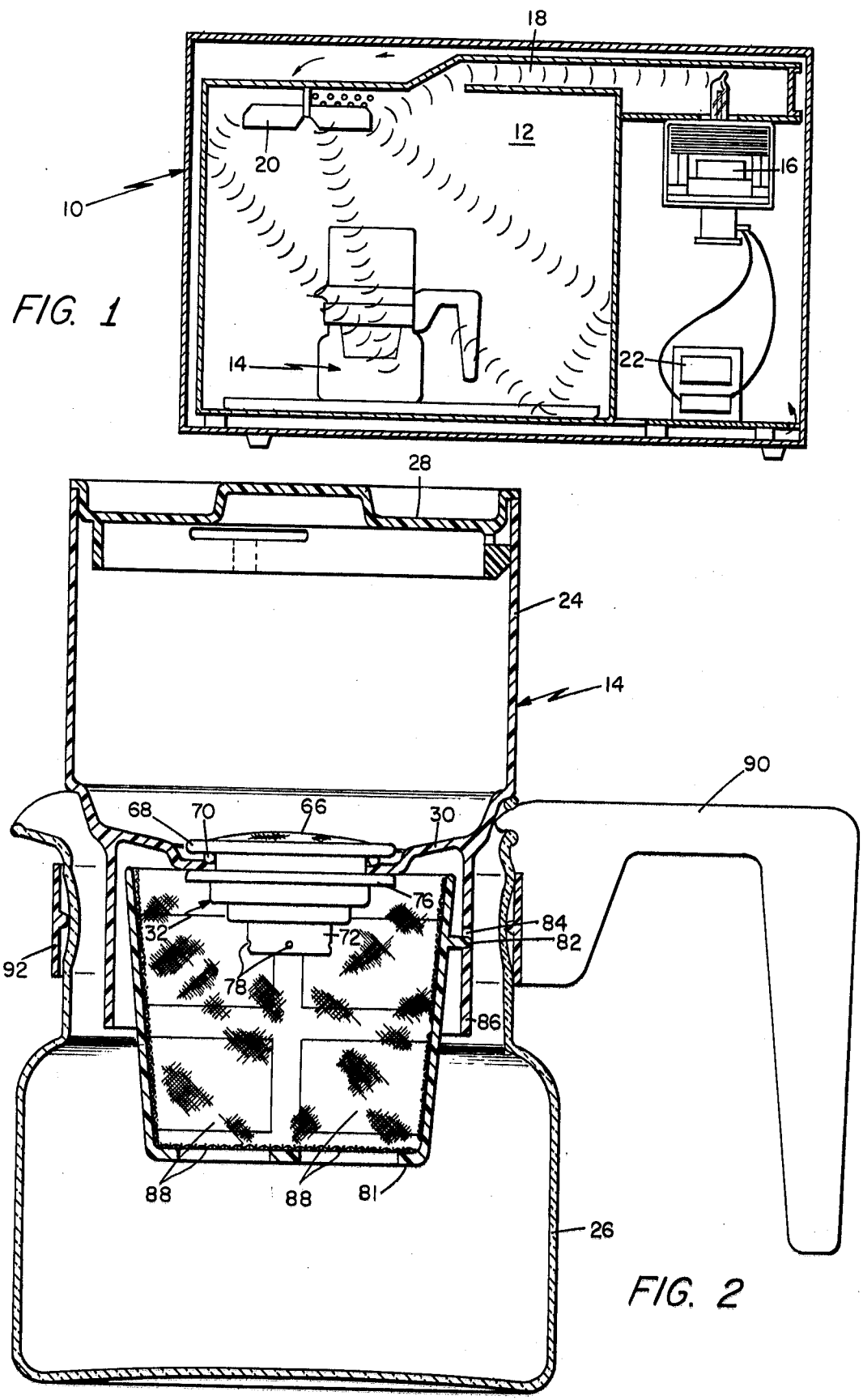
FIG. 1 is a vertical sectional view of a microwave oven showing a coffee maker embodying the invention located within the oven cavity.
FIG. 2 is a vertical sectional view of the coffee maker embodying the invention.

Referring more particularly to the drawings wherein like characters of reference designate like parts throughout the several views, there is shown in FIG. 1 a microwave oven 10 including an oven cavity 12 having a coffee maker 14 which may be positioned therein through a door (not shown). The oven cavity is supplied with microwave energy from a magnetron 16 via a waveguide 18. While the magnetron 16 may generate energy of any desired frequency a frequency of about 2.45 KMH is particularly suitable. The oven cavity 12 has internal dimensions which are many times the free space wavelength of said frequency so that many different resonant modes may be produced therein and such modes may be cyclically distributed by a mode stirrer 20.

The cathode of magnetron 16 is supplied with filament heater power and anode voltage power at a voltage of, for example, 4000 volts from a high voltage power supply 22 by suitable wiring while the anode of the magnetron 16 is grounded.

It is believed that this provides sufficient description of the microwave oven 10 and for more information reference may be made to many of the existing patents or to copending application Ser. No. 671,469, filed by McConnell et al. and assigned to the same assignee as the present invention.

Figure 3:
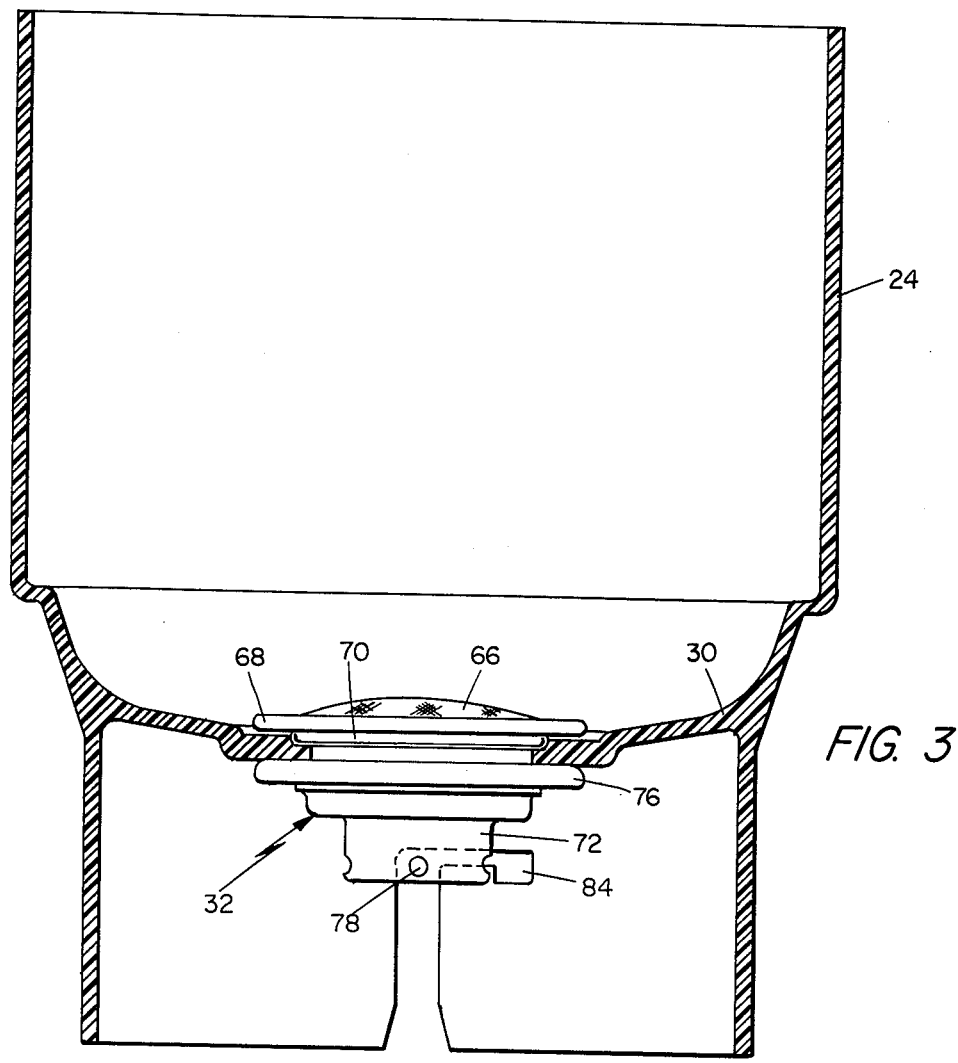
FIG. 3 is an enlarged vertical sectional view of the reservoir of the coffee maker.
Figure 4:
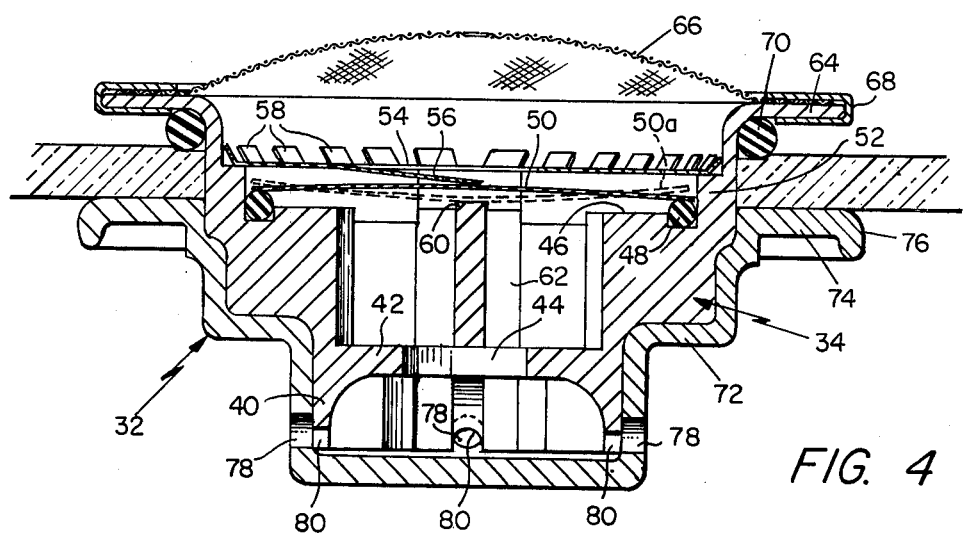
FIG. 4 is an enlarged vertical sectional view of the microwave valve used in the coffee maker.

Referring more particularly to FIGS. 2–4, the coffee maker or brewer 14 includes an upper and a lower section, the upper section being a reservoir 24 and the lower section being a pot 26. The upper end of pot 26 is open and is shaped to receive the lower end of the reservoir 24 as shown. The reservoir 24 is also open at the top so as to permit water to be placed therein in a selected amount such as one cup, two cups, five cups or any quantity depending on the size of the appliance. A suitable cover 28 is adapted to be fitted into the upper end of the reservoir as a closure. The lower end or bottom 30 of the reservoir is preferably slightly concave and terminates in an aperture within which is sealed a thermal valve 32. Valve 32 is a normally closed bimetal valve which is thermally opened by the heat of the water in the reservoir 24.

Referring now particularly to FIG. 3, the valve 32 is shown as including a valve body or housing 34 which may be of metal or molded plastic having a hollow central chamber 36, with the upper end thereof being the valve inlet opening. Housing 34 is generally circular in cross-section and the inlet portion 38 thereof is of relatively large diameter. Depending from portion 38 is a relatively small diameter outlet portion 40. Inlet portion 38 at its upper end contains the generally circular chamber 36, and outlet portion 40 contains a transverse integral web 42 having a smaller aperture 44 therein of restricted predetermined size forming the valve outlet opening. On the ledge 46 formed at the juncture between inlet portion 38 and outlet portion 40 and in a shallow groove therein is an O-ring 48 which constitutes a valve seat and which is made of a resilient material such as natural or synthetic elastomer resistant to the temperatures to which the device is subjected.

An inverted dish-shaped bimetallic thermostatic valve member or disc 50 is positioned in chamber 36 with its peripheral edge resting on the O-ring, thus sealing the opening into the outlet portion 40 and preventing escape of any water from the reservoir 24. The inner side wall of chamber 36 is formed with a second circumferential step or shoulder 52 upon which is positioned the peripheral edge portion of a retainer disc 54. Disc 54 is preferably made of a resilient, flexible material such as spring stainless steel or the like, and has a spring arm 56 struck downwardly therefrom. Spring arm 56 projects downwardly into resilient engagement with the valve disc 50 to resiliently bias the disc 50 into engagement with the O-ring 48 when the disc 50 is in closed or unactuated position. The slot in retainer disc 54 where the arm 56 was struck out serves as an opening through which water flows into the bimetal valve disc 50.

Retainer disc 54 is of somewhat larger diameter than the diameter of the portion of the chamber above the step 52. Therefore, the outer margin of disc 54 is bent up and provided with a spaced series of radial slots therearound to form a plurality of spaced flexible tabs 58. The disc 54, when the valve is being assembled, is forced downwardly onto the step 52. This forces the tabs 58 inwardly and causes them to forcibly engage the sides of the chamber so as to prevent removal of the disc 54. The slots between tabs 58 also serve as openings in the disc through which water or other fluid may flow toward valve disc 50.

The disc 50 is automatically abruptly movable over center in a snap action at a predetermined temperature such as about 195° F, for example. When thus thermally actuated, the disc 50 abruptly assumes the concave shape shown by dotted lines 50a in FIG. 4. In this second or actuated position the center of the disc 50 will rest upon an upwardly extending projection 60 formed on an integral spider 62 which extends across the inlet end of the outlet opening 44. The upper end of the projection 60 extends above the level of the ledge or shoulder 46 and thus provides the desired abutment means upon which the center of the heated disc rests. The disc is of course, of slightly smaller diameter than the adjacent encircling portion of the chamber 36 so that such movement of the disc is unimpeded. It will be apparent that when the disc is in the actuated position, water will readily flow downwardly around its periphery into and through the outlet passage 44.

The upper end of the valve body 38 is outwardly flanged as indicated by numeral 64 and a domed filter screen 66 is mounted with its marginal area disposed on the flange and held in place by a channelled circumferential retainer clip 68.

As pointed out above, the valve 32 is located within an opening in the bottom 30 of the reservoir. It is inserted downwardly from above into the opening so that the wall of the opening relatively closely encircles the outer circumference of the inlet portion of the body. An O-ring 70 immediately beneath the annular flange 64 seals the opening so that no water can escape.

A cup-shaped element 72 closely encases the valve portions beneath the reservoir bottom 30 and includes an outwardly flanged portion 74 which engages the under-side of the reservoir bottom 30 around the opening. Flange 74 not only aids in applying pressure so that the O-ring functions properly to seal the opening, but also serves as a radiation shield with a corona edge 76. This lower radiation shield is matched by the upper radiation shield formed by the valve flange 64 and retainer clip 68 and so forms a rounded edge or corona shield to prevent arcing which could damage the reservoir when microwave energy is applied to the device.

The lower end of the outlet portion 40 of the valve body is a hollow annular structure which projects downwardly below the outlet opening 44. The lower end of the element 72 closes the outlet portion 40 and is provided in its side wall with spaced openings 78 which are aligned with respective openings 80 in the end of the outlet portion 40. Channels 82 in the inner wall of the outlet portion 40 allow the openings 78 and 80 to communicate freely with the valve outlet opening 44. Thus, fluid passing through the valve from opening 44 will be spread or distributed by openings 78 in a desired manner.

Referring again to FIG. 2, it will be seen that a filter basket 81 is removably positioned below the valve for containing coffee grounds. The basket 81 has projections 82 located at inervals throughout its outer circumference which are adapted to interfit with slots 84 provided therefor in a hollow cylindrical portion 86 depending from the reservoir from the reservoir bottom 30 in spaced encircling relation to the valve 32. The projections 82 and slots 84 provide bayonet connections which provide detachable suspension of the basket beneath the valve. The basket 81 has screenlike or perforated panels 88 built into its sides so that water from the valve openings 78 will be spread or distributed over the supply of coffee grounds in the basket. After passing through and dissolving at least a portion of the grounds, the liquid escaping through the filter panels 88 into the pot 26 is coffee. It will be apparent, however, that the basket may be removably supported by any other means, if desired.

In the operation of the microwave coffee maker embodying the present invention, a reservoir 24 having a normally closed bimetal valve 32 therein is filled to the desired level with water, and the filter basket 81 with coffee grounds is attached to it by the simple bayonet closure means 82–84. The reservoir is then positioned in the top of the pot 26 and the assembly is placed in a microwave oven 10. The oven is operated for a selected time period to generate microwave energy which passes from the magnetron 16 through the waveguide 18 into the oven cavity 12. The stirrer 20 causes the microwaves to be distributed throughout the oven and in doing so they enter the water in the reservoir, coupling with the water to heat it.

When the water has been heated to the temperature at which the bimetal disc 50 operates, such as 195° F, for example, the disc 50 snaps open, allowing the heated water to flow down through the valve to the coffee grounds. The heated water, upon contacting the grounds, causes some dissolving of the grounds. Thus, the water after passing through the grounds and out the filter basket has been converted to coffee. The device may be then removed from the microwave oven and the coffee eventually removed from the pot.

It is to be understood that this drip method of making coffee can be utilized to produce coffee in an extremely short time depending upon the amount of coffee being made and on the type of microwave oven being used. For example, two cups (ten ounces) of water can be heated in a Radarange (trademark) microwave oven, Model RR4, for example, manufactured and sold by Amana Refrigeration, to a temperature of about 190° F. in about four minutes. The valve will open at this temperature and water will flow from the reservoir, through the valve, coffee grounds and filter basket into the pot. This flow will occur at a rate of about ten ounces per minute, plus or minus one ounce per minute. In devices of the character described, this flow rate has been found to be optimum. However, the rate may be different, if desired. Flow, of course, may be regulated by the construction of the valve and filter basket. Actual overall time for heating the water will vary depending on the ability of the particular microwave oven being used to efficiently couple with the water. Also, differences in purity of water may cause some small differences in time, as well as differences in the shape of the body of water being heated.

It is to be understood that at least the reservoir 14 should be made of plastic or glass which will couple very little if at all with the microwaves. The pot 26 and filter basket 81 will also be nonmetallic, such as plastic or glass. Thus, the only metal elements will be the parts of the valve. However, it has been found that these metal elements will not be substantially affected by the microwaves if properly shielded, so that only the water temperature will affect operation of the valve.

The handle 90 may be of plastic transparent to microwaves and is preferably attached to the pot 26 by an encircling nonmetallic band 92.

It will be apparent that the microwave oven need be operated only for a period of time necessary to effect the opening of the valve since the bimetal valve disc will automatically refrain from closing long enough for the water to drain through, since the water will retain its heat for a substantial length of time. However, in some cases an operator may wish to continue operating the oven for a time after the water has all drained into the pot. This will not interfere with the coffee making process but may cause the coffee to boil.

In some cases it may be considered desirable to prevent the microwaves from heating the coffee grounds. In that event the grounds may be shielded by encircling the basket with a metal band spaced from it to allow the water to escape.

From the foregoing it will be apparent that all of the objectives of this invention have been achieved in the coffee maker shown and described herein and in the method disclosed. However, it will also be apparent that various modifications may be made in the device by those skilled in the art without departing from the spirit of the invention as expressed in the accompanying claims. Therefore, all matter shown and described is to be be interpreted as illustrative and not in a limiting sense.

What is claimed is:

1. A drip-type coffee making appliance for use in a microwave oven comprising a pot having an open upper end, a microwave-transparent reservoir removably seated on the open upper end of the pot for containing water to be heated, said reservoir being transparent to microwave energy and having a bottom wall, a thermal valve sealed within an aperture in said bottom wall and including a valve seat positioned for contact by said water a container removably positioned beneath the valve for holding coffee grounds to be contacted by water passing from the reservoir through the valve to the pot, and means for shielding said thermal valve from microwave energy whereby the valve will operate only in response to changes in temperature of the water.

2. A coffee making appliance as set forth in claim 1 wherein said reservoir is provided with a integral downwardly extending annular support portion encircling the valve, and said container is removably connected to said portion.

3. A coffee making appliance as set forth in claim 2 wherein said portion has apertures therein, and the outer wall of the container is provided with radial projections shaped for removable interfit with said apertures in the portion.

4. A coffee making appliance as set forth in claim 1 wherein said valve has a first outer wall portion shaped to interfit with the inner peripheral edge portion of the aperture in the bottom wall of the reservoir, the valve further having additional outer wall portions of diameter larger than the diameter of said first outer wall portion and positioned respectively above and below said first outer wall portion, said additional wall portions further being disposed in sealing relation to the annular portion of said bottom wall encircling the aperture therein, said additional wall portions having rounded edges and being spaced apart a predetermined distance forming a radiation seal.

5. An appliance for heating a liquid by microwave energy comprising a pot having an open upper end, a microwave-transparent reservoir seated on the open upper end of the pot for containing the liquid to be heated and having a bottom wall, and a thermal valve sealed within an aperture in said bottom wall in thermal contact with liquid in the reservoir, said valve including a normally closed bimetal element adapted to be opened when the liquid is heated to a predetermined temperature by microwave energy, said valve having a first outer circumferential wall portion shaped to interfit with the inner peripheral edge portion of said aperture, the valve further having additional circumferential outer wall portions adjacent the edge of said aperture defining a microwave seal around the valve.

6. An appliance as set forth in claim 5 wherein said additional circumferential outer wall portions are of a diameter larger than the diameter of said first outer wall portion and are positioned respectively above and below said first outer wall portion, said additional wall portions further being disposed in sealing relation to the annular portion of the bottom wall encircling the aperture therein and having rounded edges and being spaced apart a predetermined distance to form a radiation seal.

7. Apparatus for making coffee comprising a source of radiated microwave energy, a coffee brewing device comprising a pot and a reservoir removably seated on the pot, a thermally actuated valve carried by the reservoir, and a removable container positioned beneath the valve for holding coffee grounds to be contacted by water passing from the reservoir through the valve to the pot, said reservoir being transparent to microwave energy and being provided with a bottom wall having an aperture therein, and said valve comprising a valve casing sealed within the aperture and having a vertically extending passageway therethrough, and a bimetal closure member located in normally closing relation to said passageway and movable when heated by said water into open relation to the passageway.

8. Apparatus as set forth in claim 7 wherein means is provided for shielding said bimetal closure member from said microwave energy.

9. A drip-type coffee making appliance for use in a microwave oven comprising a pot having an open upper end, a microwave-transparent reservoir removably seated on the open upper end of the pot, said reservoir being transparent to microwave energy and having a bottom wall, a thermal valve sealed within an aperture in said bottom wall, and a microwave-transparent container removably positioned beneath the valve for holding coffee grounds to be contacted by water passing from the reservoir through the valve to the pot, said valve comprising a casing sealed within the aperture and having a vertical passageway, and a bimetal disc located in normally closing relation to said passageway and movable when heated by said water into open relation to the passageway.

10. An appliance as set forth in claim 9 wherein means is provided for shielding said bimetal disc from the microwave energy.

* * * * *